Dec. 15, 1942.  W. S. TORRENCE  2,305,045
LEVEL WINDING DEVICE
Filed Feb. 14, 1940
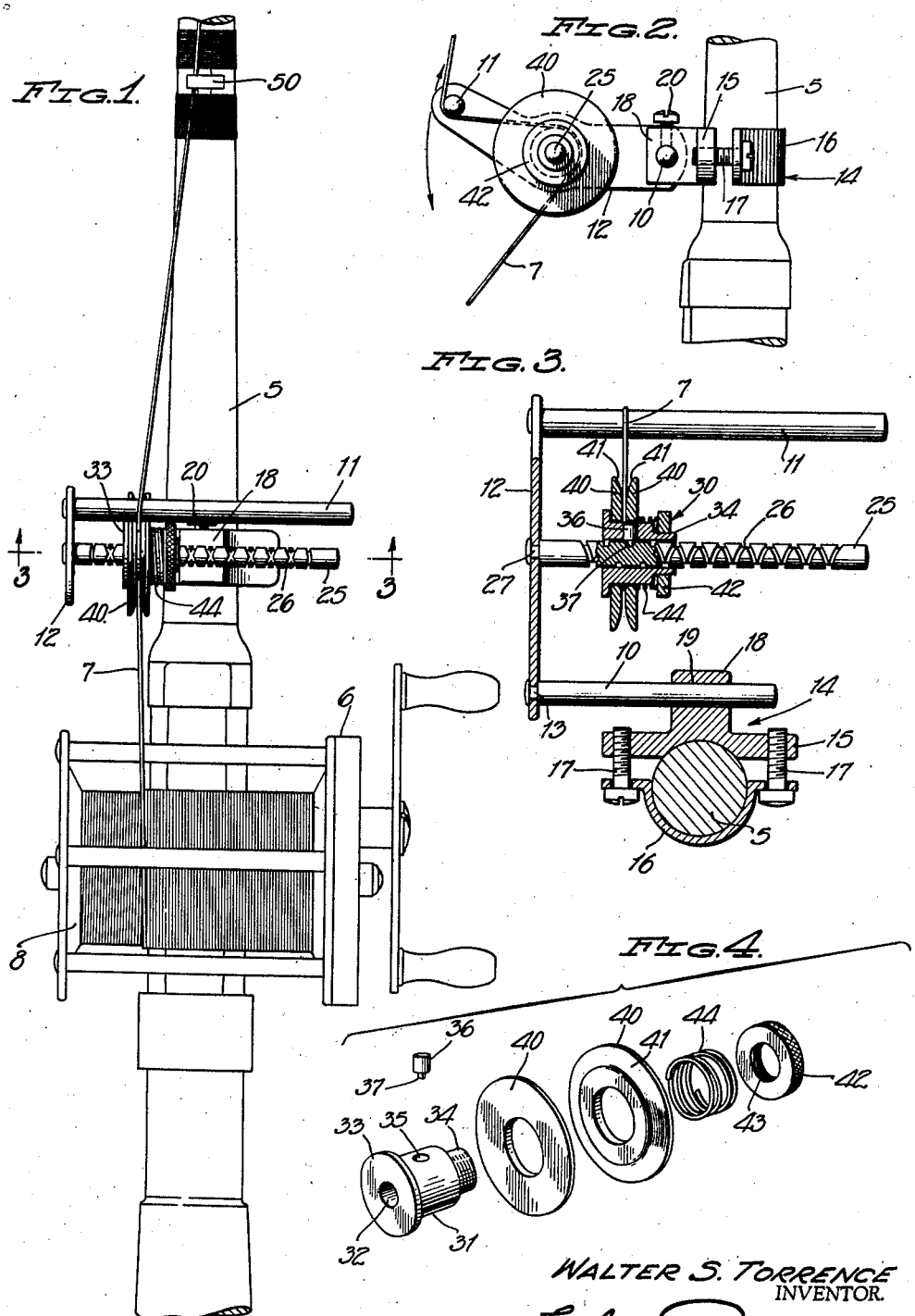
WALTER S. TORRENCE
INVENTOR.
BY Ely Pattison
ATTORNEYS.

Patented Dec. 15, 1942

2,305,045

UNITED STATES PATENT OFFICE 2,305,045

LEVEL WINDING DEVICE

Walter S. Torrence, Hyde Park, N. Y.

Application February 14, 1940, Serial No. 318,821

2 Claims. (Cl. 242—158)

The present invention relates to new and useful improvements in fishing tackle and more particularly it pertains to a novel device for evenly laying a fishing line upon the spool or drum of a fishing reel and commonly known as a level winding device.

I am aware that level winding devices for fishing reels have been heretofore employed, but all such devices with which I am familiar are incorporated directly in the fishing reel and while such devices operate satisfactorily with light, fresh water tackle, they do not readily lend themselves to use with the heavier salt water tackle of the type employed in deep sea, or surf fishing.

It is the primary object of the invention to provide a novel level winding device which, while highly efficient for use in connection with the lighter fresh water reels, is particularly adaptable for use in connection with the heavier type salt water tackle employed for deep sea and surf fishing.

A feature of the invention resides in a novel construction whereby the level winding device is in the form of a separate device capable of attachment to or detachment from a fishing rod or fishing reel, the device not forming a permanent part of either.

In all level winding devices with which I am familiar, there is a double spirally threaded member which is incorporated with the reel and which is positively driven when the reel spool or drum is driven for the purpose of moving a line laying traveler to and fro to lay the line evenly upon the reel spool or drum.

A further feature of the present invention resides in the provision of a nonrotatable double spirally threaded member upon which the traveling line layer is both rotatably and reciprocatively mounted.

Still a further feature of the invention resides in a novel type of line layer which instead of being positively driven from the reel, is driven by the fishing line as it is wound upon the reel spool or drum.

A further feature of the invention resides in a novel construction of line laying traveler which permits of engagement and disengagement of the line with the traveler at will without necessitating removal of any of the parts. This feature I consider highly important since it permits of free casting of the line without the attendant drag of the level winding device thus minimizing back lash, and further, subjects the level winding device to less wear, since it is not in use during casting of the line.

Still a further feature of the invention resides in a novel construction whereby excess water is removed from the line before it is wound upon the reel spool or drum and at a point remote with respect thereto.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawing illustrating the invention in its preferred form and the following detailed description of the constructions therein shown.

In the drawing:

Figure 1 is a view in elevation partly broken away illustrating a fishing rod, a conventional reel mounted thereon, and a level winding device constructed in accordance with the present invention, Figure 2 is a fragmentary detail view in elevation taken at right angles to Figure 1, Figure 3 is a detail sectional view on an enlarged scale taken substantially on the line 3—3 of Figure 1, and, Figure 4 is a distended perspective view.

Referring to the drawing by reference character, the fishing rod is designated 5, the reel being designated 6, 7 designating a fishing line adapted to be wound upon the spool or drum 8 in the ordinary manner.

As heretofore stated, the level winding device does not constitute a component part of the fishing reel as is the case in devices of this type as generally constructed, but is instead in the form of an attachment which may be removably mounted upon a fishing rod, or reel as desired.

The level winding device of the present invention comprises a frame consisting of two bars 10 and 11 which are secured in spaced relation to each other to a suitable end plate 12 in any desired manner such as at 13, the bars being secured to the end plate 12 with their other ends free.

The bar 10, together with a clamp 14, provides the means for attaching the device to the fishing rod 5, the clamp comprising two rod gripping members 15 and 16 which are held in clamping engagement with the rod 5 by means of bolts or the like 17. Projecting from the bar 15, there is a lug 18, which is provided with an opening 19, for the reception of the bar 10 and said bar is retained against movement in the opening 19 by means of a set screw or the like 20, see Figure 2. This construction permits of adjustment of the frame to any desired angle relatively to the rod 5 and reel 6 merely by loosening the set screw 20 and rocking the bar 10 within the opening 19 and tightening the set screw 20 when the desired angle has been attained.

The reference numeral 25 designates a double threaded screw member in the form of a bar having a double thread 26 thereon. This double threaded member is secured at one end as at 27 to the end plate 12, at a point intermediate the bars 10 and 11.

The reference numeral 30 designates a line laying traveler and this traveler is adapted to move to and fro upon the double threaded member 25 in order to lay evenly the line 7 upon the spool or drum 8 of the reel 6.

The traveler is shown in detail in Figure 4 and it comprises a sleeve member 31 having an opening 32 for the reception of the double threaded member 25. At one end of the sleeve 31, there is a flange 33 and upon its other end the sleeve 31 has a reduced threaded extension 34. Extending radially through the main body portion of the sleeve 31 to the opening 32, there is an opening 35 which is adapted to receive a pin or the like 36 having a reduced extension 37 for traveling engagement with the thread 26 of the double threaded member 25. Freely rotatable upon the main body portion of the sleeve 31 there are friction disks 40, the inner face of each of which is beveled as at 41 for a purpose to be hereinafter described. The reference numeral 42 designates a nut which is internally threaded as at 43 for engagement with the reduced threaded extension 34 of the sleeve 31 and adapted for interposition between the nut 42 and the outer friction disk 40, there is a coil spring 44.

In assembling the device the sleeve 31 is placed upon the double threaded member 25 after which the pin 36 is positioned in the opening 35 with the reduced extension 37 of the pin 36 in the thread 26 of the double threaded member 25. The friction disks are next positioned upon the main body portion of the sleeve 31 after which the coil spring 44 is placed upon the main portion of the sleeve and the nut 42 threaded upon the reduced extension 34 thereof. By this construction, it will be obvious that by adjustment of the threaded nut 42, the tension of the spring 44 may be regulated and consequently any degree of friction between the friction disks 40 and the line 7 may be obtained.

From the foregoing it will be apparent that the traveler 30 is freely rotatable upon the double threaded member 25 and that when the traveler 30 is rotated, by reason of the engagement of the reduced extension 37 with the thread 26 of the double threaded member, the traveler will be caused to move to and fro upon the double threaded member 25.

The traveler 30 is moved by the fishing line 7 as it is wound upon the reel 6, the fishing line passing between the friction disks 40 and into frictional engagement with the main body portion of the sleeve 31.

The bar 11 forms a guide for the fishing line 7 as it passes from the stationary guide 50 of the rod to the reel 6 and in setting the device for operation, the fishing line 7 is passed over the bar 11 and under the double threaded member 25, the fishing line lying between the friction disks 40.

Obviously, as the spool or drum 8 of the reel 6 is rotated to retrieve the fishing line, frictional engagement of the fishing line with the main body portion of the sleeve 31 will cause a rotation of said sleeve to rotate the entire laying assembly and cause the same to travel to and fro in the manner heretofore described.

The beveled faces 41 of the friction disks 40 permit of ready insertion of the fishing line 7 between said disks. This is desirable for the reason that the more practical manner of operating the device is to employ the line laying mechanism only when retrieving the line, the line being disconnected therefrom during the line casting operation. This can be readily accomplished by reason of the fact that one end of the bar 11 and one end of the double threaded member 25 is free and therefore it is only necessary to grasp the line in advance of the bar 11 and move it to the right in Figure 1 until it clears the free end of the bar 11 at which time it can be removed from between the friction disks 40 and the line is entirely free of the laying mechanism. After the cast has been made, the line is again grasped and pulled until sufficient slack is obtained to thread the line over the bar 11 and between the friction disks 40, the beveled faces 41 of the friction disks readily permitting of insertion of the line between said disks.

In addition to forming a guide for the line, the bar 11 serves to wipe or remove water from the line 7 as it is retrieved thereover and this function is also performed by the friction disks 40 which in addition to serving as guides to direct the line to the sleeve 31, tend, by reason of the pressure exerted thereby upon the line, to remove excess water therefrom.

It will be noted by reference to Figure 3 that the entire assembly is readily disassembled or assembled for purposes of replacement or repair, merely by removing the nut 42, whereupon the coil spring 44 and friction disks 40 may be moved along the sleeve member 31 and off the free end thereof after which the pin 36 may be removed, since it will be noted that the outer friction disk 40 serves as means to retain the pin 36 in the opening 35.

While in the present embodiment, the invention has been illustrated as being attached to the rod 5, it is obvious that slight changes in the construction of the clamp 14, the device may be attached to a fishing reel and it is to be understood that the device of the invention is in the form of a separate attachment capable of attachment to either a fishing rod or reel.

While the invention has been herein illustrated in its preferred form it is to be understood that it is not to be limited to the specific details of construction herein shown and that it may be practiced in other forms without departing from the spirit thereof.

Having thus described the invention, what is claimed as new is:

1. In a device of the character described, a double thread screw member, means for attaching said screw member to a fishing rod, a sleeve slidably and rotatably mounted upon the double thread screw member, a pin loosely carried by the sleeve and extending therethrough into running engagement with the threads of the double screw member, a pair of friction disks carried by the sleeve and having rotary and sliding movement thereon, one of said friction disks serving to retain the aforementioned pin in operative position in the sleeve, and means for retaining the friction disks in position upon the sleeve.

2. In a device of the character described, a double thread screw member, means for attaching said screw member to a fishing rod, a sleeve slidably and rotatably mounted upon the double thread screw member, a pin loosely carried by the sleeve and extending therethrough into running engagement with the threads of the double screw member, a pair of friction disks carried by the sleeve and having yielding rotary and sliding moving thereon, one of said friction disks serving to retain the aforementioned pin in operative position in the sleeve, and means for retaining the friction disks in position upon the sleeve, said means comprising a nut having threaded engagement with the sleeve and a spring interposed between the nut and one of the friction disks.

WALTER S. TORRENCE.